US012801089B2

(12) United States Patent
Nagahara et al.

(10) Patent No.: US 12,801,089 B2
(45) Date of Patent: Nov. 17, 2026

(54) HOLD-DOWN MEMBER, MANUFACTURING METHOD FOR SAME AND TIMEPIECE

(71) Applicant: CASIO COMPUTER CO., LTD., Tokyo (JP)

(72) Inventors: Miho Nagahara, Ome (JP); Yukio Funabara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 707 days.

(21) Appl. No.: 17/846,645

(22) Filed: Jun. 22, 2022

(65) Prior Publication Data

US 2022/0413441 A1 Dec. 29, 2022

(30) Foreign Application Priority Data

Jun. 24, 2021 (JP) ................................ 2021-104686
Jan. 28, 2022 (JP) ................................ 2022-011677

(51) Int. Cl.
*G04B 37/22* (2006.01)

(52) U.S. Cl.
CPC .................................... *G04B 37/22* (2013.01)

(58) Field of Classification Search
CPC .. G04B 37/22; G04B 37/005; G04B 37/0033; G04B 3/04; G04B 37/04
USPC .......................................................... 368/134
See application file for complete search history.

(56) References Cited

U.S. PATENT DOCUMENTS

| | | | | | |
|---|---|---|---|---|---|
| 4,785,434 | A * | 11/1988 | Shoji | G04B 13/023 | |
| | | | | 368/323 | |
| 5,442,602 | A * | 8/1995 | Hirai | G04B 37/005 | |
| | | | | 368/286 | |
| 2009/0122489 | A1* | 5/2009 | Tominaga | B62D 5/0406 | |
| | | | | 361/709 | |
| 2016/0179055 | A1* | 6/2016 | Momose | G04B 37/0418 | |
| | | | | 368/299 | |
| 2017/0097610 | A1* | 4/2017 | Matsunaga | G04B 47/00 | |
| 2018/0275608 | A1* | 9/2018 | Ichimura | G04B 37/106 | |
| 2019/0179265 | A1 | 6/2019 | Ozawa | | |
| 2019/0243309 | A1* | 8/2019 | Mukaiyama | G04B 43/00 | |
| 2021/0096514 | A1* | 4/2021 | Schenk | H02J 50/10 | |

FOREIGN PATENT DOCUMENTS

| | | | | | |
|---|---|---|---|---|---|
| CN | 1790196 | A | * | 6/2006 | G04G 21/02 |
| CN | 205983027 | U | * | 2/2017 | |
| JP | H11183650 | A | | 7/1999 | |
| JP | 2002348095 | A | | 12/2002 | |

(Continued)

OTHER PUBLICATIONS

JP-2018020504-A Machine Translation from PE2E Search (Year: 2018).*

(Continued)

*Primary Examiner* — Edwin A. Leon
*Assistant Examiner* — Kevin Andrew Johnston
(74) *Attorney, Agent, or Firm* — Scully, Scott, Murphy & Presser, P.C.

(57) ABSTRACT

A hold-down member including a plate member which is arranged on a first member having an electronic component and supports the first member, and a resin sheet which is adhered to the plate member, pressed by a second member that is arranged to be rotatable with respect to the first member, and slides on the second member.

13 Claims, 8 Drawing Sheets

(56) References Cited

FOREIGN PATENT DOCUMENTS

| | | | | |
|---|---|---|---|---|
| JP | 2007132771 | A | | 5/2007 |
| JP | 2007237384 | A | | 9/2007 |
| JP | 4655894 | B2 | | 3/2011 |
| JP | 2015025683 | A | * | 2/2015 |
| JP | 2017142257 | A | | 8/2017 |
| JP | 2018020504 | A | * | 2/2018 |
| JP | 2019105472 | A | | 6/2019 |

OTHER PUBLICATIONS

Notice of Reasons for Refusal dated Oct. 3, 2023 received in Japanese Patent Application No. JP 2022-011677.

* cited by examiner

HOLD-DOWN MEMBER, MANUFACTURING METHOD FOR SAME AND TIMEPIECE

CROSS-REFERENCE TO RELATED APPLICATIONS

This application is based upon and claims the benefit of priority from the prior Japanese Patent Applications No. 2021-104686, filed Jun. 24, 2021, and No. 2022-011677, filed Jan. 28, 2022, the entire contents of which are incorporated herein by reference.

BACKGROUND

1. Technical Field

The present disclosure relates to a hold-down member that is used for electronic devices such as wristwatches, a manufacturing method for same, and a timepiece equipped with the hold-down member.

2. Description of the Related Art

For example, a wristwatch is known which has a structure where the rotation of a timepiece module in a wristwatch case due to the rotation of a back cover is prevented when a male screw section formed on the outer circumferential portion of the back cover is screwed into a female screw section formed in the lower part of the wristwatch case so as to attach the back cover to the wristwatch case, as shown in Japanese Patent Application Laid-Open (Kokai) Publication No. 11-183650.

SUMMARY

An embodiment is a hold-down member comprising: a plate member which is arranged on a first member having an electronic component and supports the first member; and a resin sheet which is adhered to the plate member, pressed by a second member that is arranged to be rotatable with respect to the first member, and slides on the second member.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 8A to FIG. 8D are diagrams showing a manufacturing method for the slick hold-down member of FIG. 4, of which FIG. 8A is a perspective view showing a positioning jig, FIG. 8B is a perspective view showing a state where a supporting member has been positioned on the positioning jig, FIG. 8C is a perspective view showing a state where the resin sheets have been adhered to the support member by the protective sheet being positioned on the positioning jig, and FIG. 8D is a perspective view showing the slick hold-down member where the protective sheet has been removed from the resin sheets adhered to the support member.

DETAILED DESCRIPTION OF THE PREFERRED EMBODIMENTS

An embodiment where the present invention has been applied in a wrist watch will hereinafter be described with reference to FIG. 1 to FIG. 7 and FIG. 8A to FIG. 8D.

Figure 1:
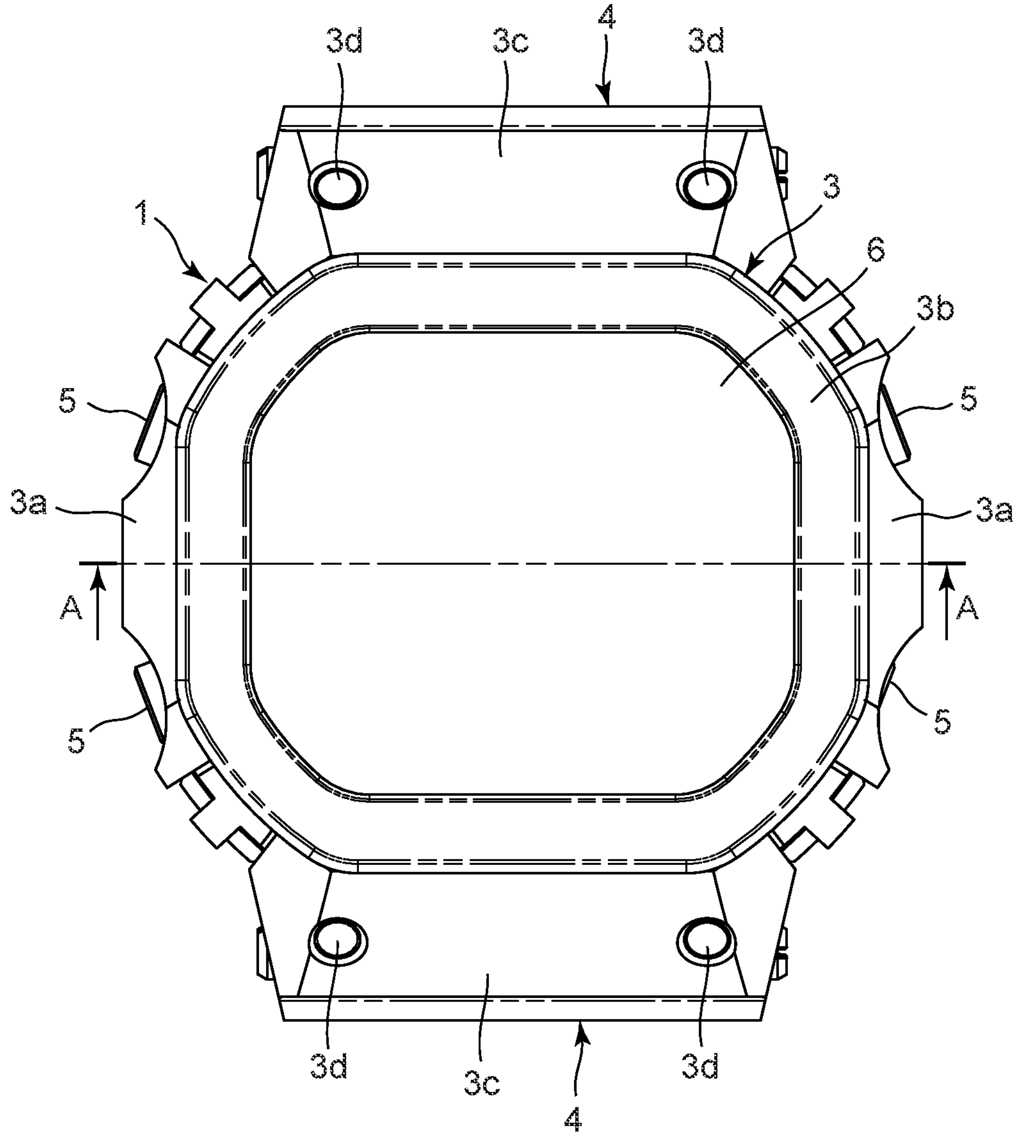
FIG. 1 is an enlarged front view showing an embodiment where the present invention has been applied in a wristwatch.
Figure 2:
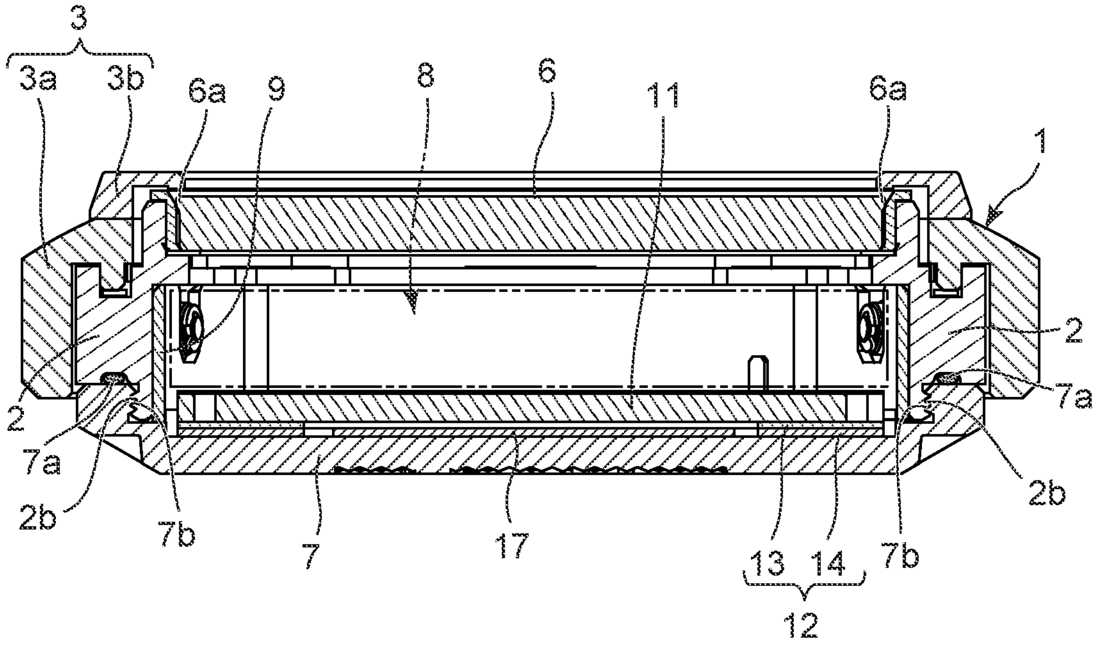
FIG. 2 is an enlarged sectional view of the wristwatch taken along the A-A arrow view in FIG. 1.
Figure 3:
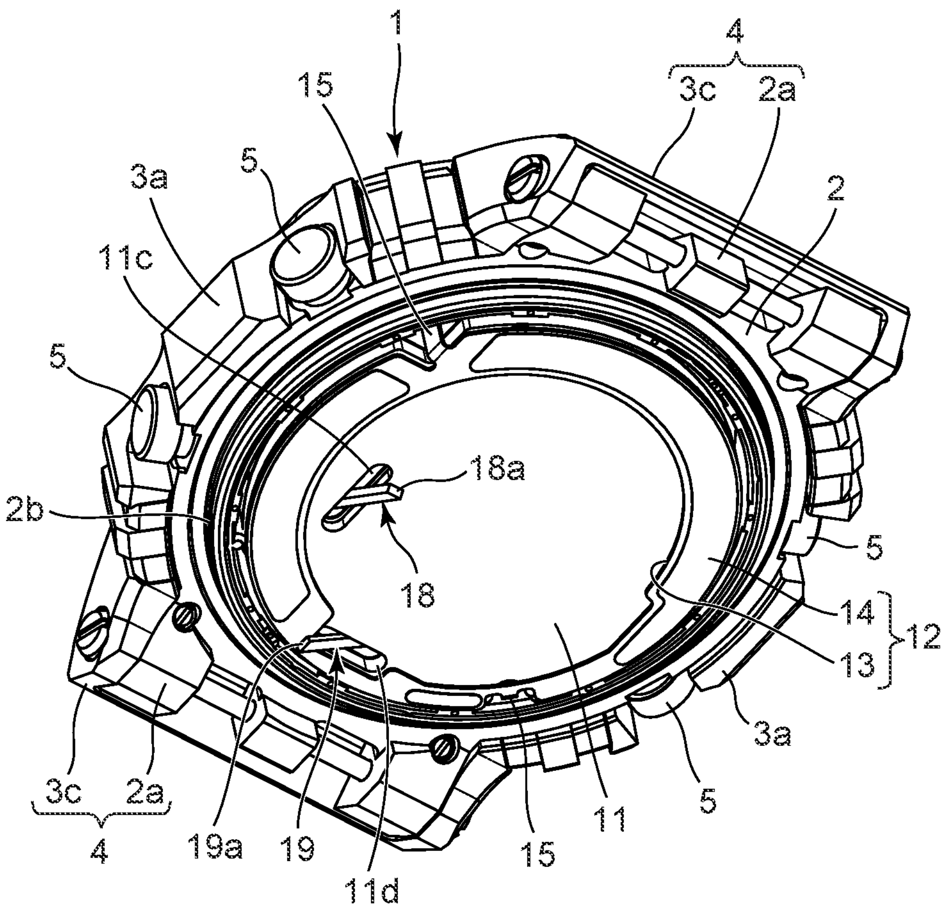
FIG. 3 is an enlarged perspective view of the back side of the wristwatch, in which the back cover of the wristwatch shown in FIG. 2 has been detached.

This wristwatch has a wristwatch case 1, as shown in FIG. 1 to FIG. 3. The wristwatch case 1 includes a case main body 2 and an exterior member 3. The case main body 2 is made of a metal such as stainless steel or titanium alloy, and band attachment projection sections 2*a* are provided on the twelve o'clock side and six o'clock side thereof.

The exterior member 3 includes first to third exterior members 3*a* to 3*c*, as shown in FIG. 1 to FIG. 3. The first exterior members 3*a*, which are side bezels, are made of metal or synthetic resin and arranged covering side surfaces of the case main body 2 on the three o'clock side and the nine o'clock side. The second exterior member 3*b*, which is an upper bezel, is made of metal or synthetic resin and arranged covering the upper parts of the case main body 2 and the first exterior members 3*a*.

The third exterior members 3*c*, which are band attachment bezels, are made of metal or synthetic resin and arranged on the upper parts of the band attachment projection sections 2*a* of the case main body 2, as shown in FIG. 1 to FIG. 3. These third exterior members 3*c* are attached to the band attachment projection sections 2*a* of the case main body 2 by a plurality of screw members 3*d*.

This wristwatch case 1 is structured such that, when the third exterior members 3*c* are fixed on the band attachment projection sections 2*a* of the case main body 2 by the plurality of screw members 3*d*, the second exterior member 3*b* is fixed on the upper part of the case main body 2 by these third exterior members 3*c*, and the first exterior members 3*a* are fixed on the side surfaces of the case main body 2 by these second exterior members 3*b*, as shown in FIG. 1 to FIG. 3.

On the twelve o'clock side and six o'clock side of the wristwatch case 1, band attachment sections 4 are provided to which watch bands (not shown) are attached, as shown in FIG. 1 and FIG. 2. Each band attachment section 4 is constituted by the corresponding band attachment projection section 2*a* of the case main body 2 and the corresponding third exterior member 3*c* which is a band attachment bezel. On the two o'clock side, four o'clock side, eight o'clock side, and ten o'clock side of the case main body 2 of the wristwatch case 1 and the first exterior members 3*a* which are side bezels, switch buttons 5 are provided.

To the upper opening of the wristwatch case 1, or more specifically, to the upper opening of the case main body 2, a watch glass 6 is attached via a packing 6*a*, as shown in FIG. 1 and FIG. 2. Also, on the lower part of the wristwatch case 1, or more specifically, on the lower part of the case main body 2, a back cover 7 is attached via a waterproof ring 7*a*. This back cover 7 is made of a conductive metal such as titanium alloy (6-4 Ti alloy) or stainless steel, and has a substantially disc shape.

Figure 6:
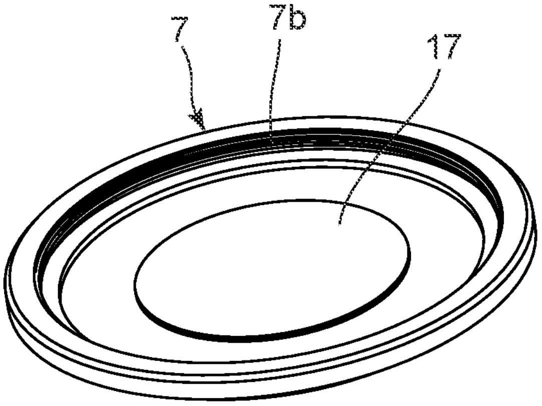
FIG. 6 is an enlarged perspective view showing the inner side of the back cover of the wristwatch shown in FIG. 2.

The outer circumferential portion of the inner surface of this back cover 7 is formed to be one step higher than the other portions, and the inner circumferential surface of this portion of the back cover 7 is provided with a female screw section 7*b*, as shown in FIG. 2 and FIG. 6. By this female screw section 7*b* being rotated and engaged with a male screw section 2*b* formed on the outer circumferential portion of the lower part of the case main body 2 of the wristwatch case 1, the back cover 7 is attached to the case main body 2 of the wristwatch case 1.

Figure 4:
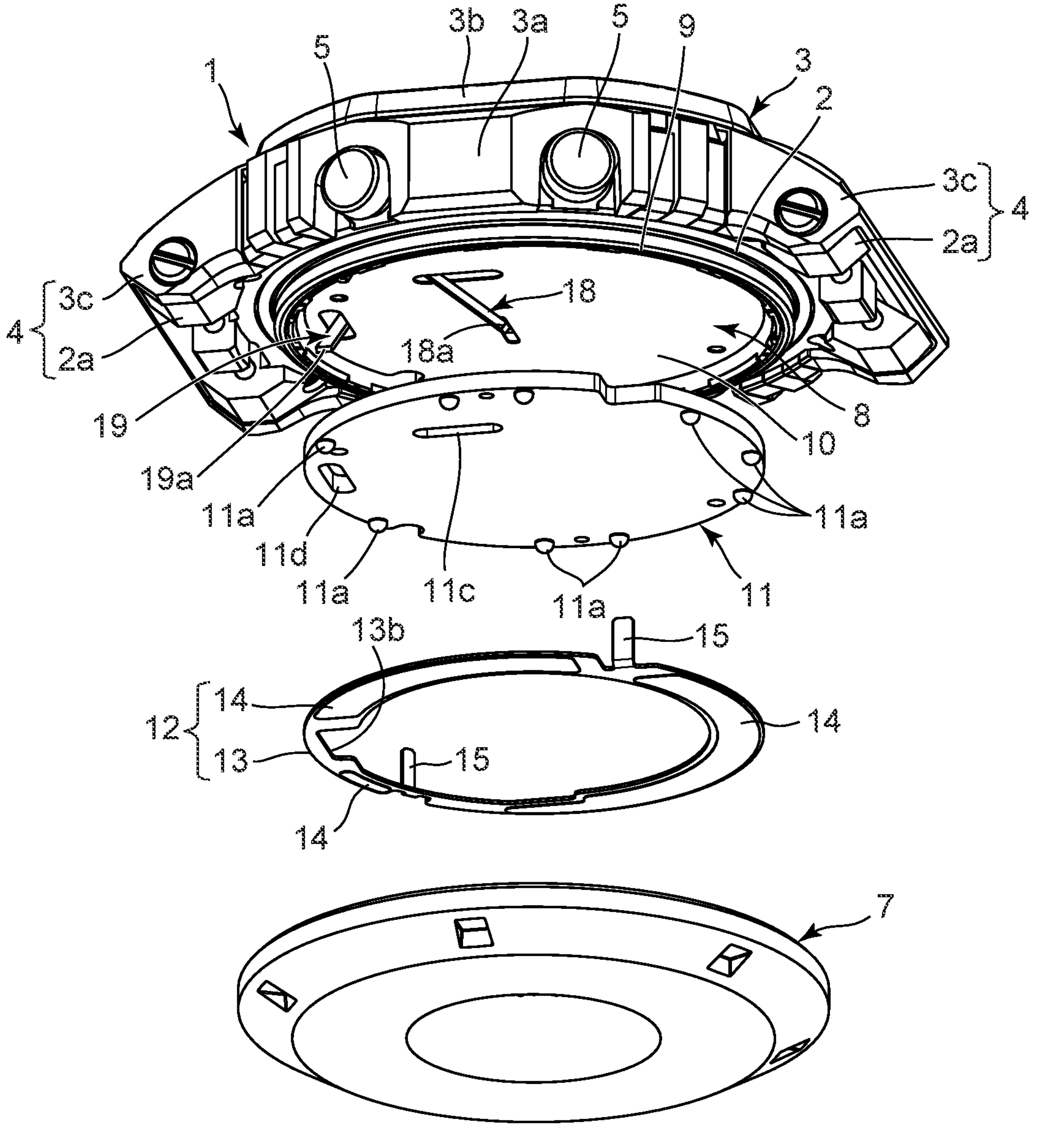
FIG. 4 is an enlarged perspective view showing the wristwatch of FIG. 3, in which a buffer member, a slick hold-down member, and the back cover have been detached therefrom.

Inside the wristwatch case 1, or more specifically, inside the case main body 2, a timepiece module 8 is arranged via a middle frame 9, as shown in FIG. 2 to FIG. 4. The timepiece module 8 is provided with a housing 10 (refer to FIG. 4). Although not shown in the drawings, this housing 10 has provided therein various electronic components necessary for timepiece functions, such as a timepiece movement for driving pointers to indicate a time of day, a display section for electro-optically displaying information regarding a time of day, a date, a day of the week, and the like, and a circuit section for driving and controlling these sections.

On the undersurface of the timepiece module 8, or more specifically, on the undersurface of the housing 10, a slick hold-down member 12 is arranged via a buffer member 11, as shown in FIG. 2 to FIG. 5. This slick hold-down member 12 has a two-layer structure where a supporting member 13 and resin sheets 14 have been laminated. The supporting member 13 is a thin plate having a substantially ring shape and made of a highly rigid metal such as stainless steel.

Figure 5:
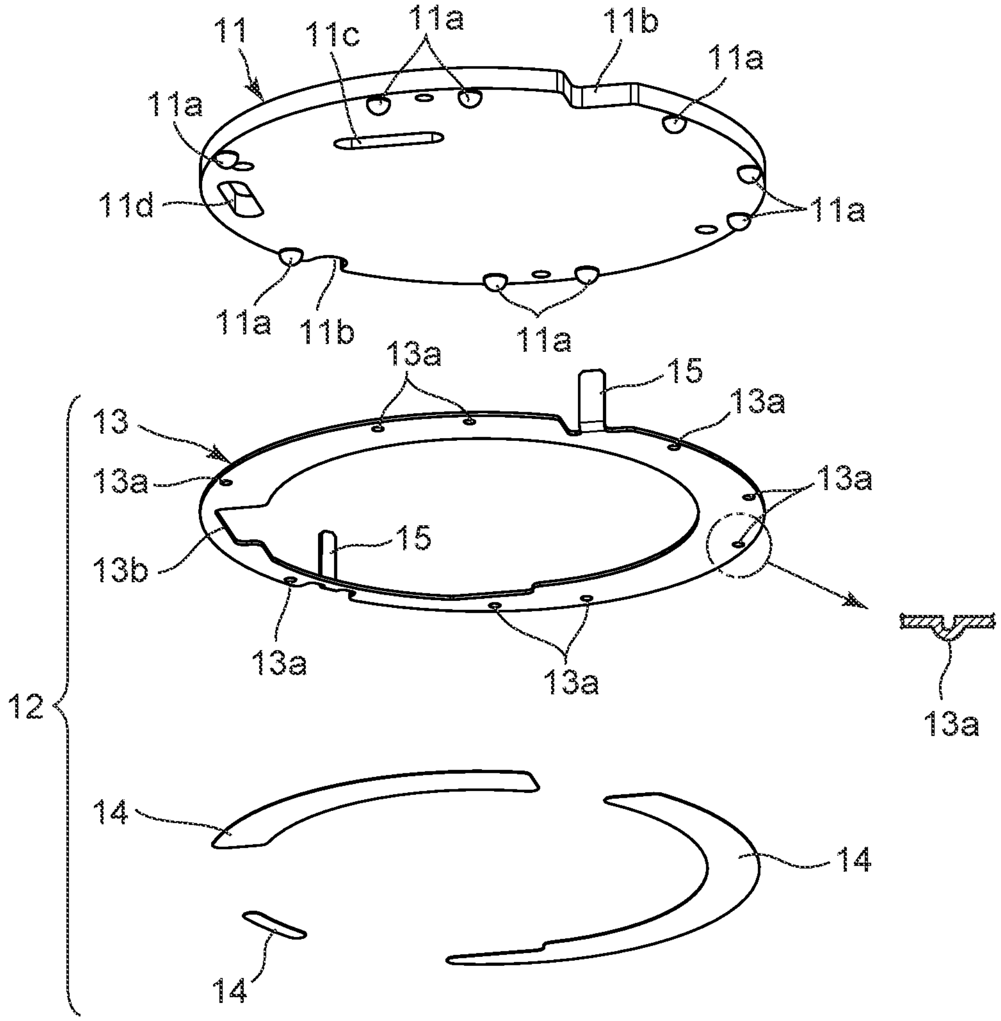
FIG. 5 is an enlarged perspective view showing the disassembled slick hold-down member which is arranged under the buffer member shown in FIG. 4.

On the supporting member 13, a plurality of projections 13*a* are formed along the circumference of the supporting member 13, as shown in FIG. 5. By the supporting member 13 being subjected to press working, these projections 13*a* are formed projecting toward the lower side which is the side opposite to the timepiece module 8. Also, on this supporting member 13, a plurality of position restriction sections 15 for restricting its position with respect to the timepiece module 8 are formed projecting toward the side (upper side in FIG. 5) opposite to the plurality of projections 13*a*, that is, the timepiece module 8 side.

The position restriction sections 15, which are provided on outer circumferential rim portions of the supporting member 13 while diametrically opposing each other, are structured to be attached to the housing 10 of the timepiece module 8 via the buffer member 11 by each position restriction section 15 being inserted into the housing 10, as shown in FIG. 4 and FIG. 5. These position restriction sections 15 restrict the position of the supporting member 13 with respect to the timepiece module 8 in the rotation directions and the radial directions.

In this embodiment, the buffer member 11 is made of an elastic material such as rubber and has a circular plate shape whose diameter is substantially equal to the outer diameter of the supporting member 13, as shown in FIG. 3 to FIG. 5. This buffer member 11 is provided with a plurality of elastic projections 11*a* which corresponds to the plurality of projections 13*a* of the supporting member 13, and a plurality of buffering notch sections 11*b* into which the plurality of position restriction sections 15 of the supporting member 13 are inserted. Also, this buffer member 11 is structured such that its outer circumferential portion is elastically pressed against the undersurface of the housing 10 of the timepiece module 8 by the supporting member 13.

On the other hand, the resin sheets 14 are made of a highly slick synthetic resin such as fluorine resin, as shown in FIG. 3 to FIG. 5. Note that, as a material for these resin sheets, a highly slick synthetic resin whose friction coefficient is lower than that of stainless steel or, more preferably, a highly slick synthetic resin whose friction coefficient is lower than that of PolyEthylene Terephthalate (PET) should be used. In the present embodiment, one resin sheet is divided into the plurality of resin sheets 14, and adhered to the undersurface of the supporting member 13 by adhesive layers 16 (refer to FIG. 7) while covering the plurality of projections 13*a*. As a result, these resin sheets 14 are structured such that, when the back cover 7 is attached to the lower part of the wristwatch case 1, their plural portions corresponding to the plurality of projections 13*a* of the supporting member 13 are pressed against the inner surface of the back cover 7.

That is, the slick hold-down member 12 has a structure where the slick resin sheets 14 have been adhered to the highly rigid supporting member 13 such that the supporting member 13 and the resin sheets 14 are consolidated, as shown in FIG. 3 to FIG. 5. More specifically, the slick hold-down member 12 is structured such that the highly rigid supporting member 13 presses the resin sheets 14 equally and reliably against the inner surface of the back cover 7.

As a result, the slick hold-down member 12 is structured such that, when the back cover 7 is being rotated to be attached to the lower part of the wristwatch case 1 by the male screw section 2*b* of the case main body 2 engaging with the female screw section 7*b* of the back cover 7, the plural portions of the resin sheets 14 corresponding to the plurality of projections 13*a* of the supporting member 13 are smoothly slid on the back cover 7 while being pressed against the inner surface of the back cover 7 in substantially point-contact states, as shown in FIG. 3 to FIG. 5.

That is, the slick hold-down member 12 is structured such that, when the back cover 7 is being rotated to be attached to the wristwatch case 1 by the male screw section 2*b* of the case main body 2 engaging with the female screw section 7*b* of the back cover 7, the timepiece module 8 in the wristwatch case 1 is not rotated along with the rotation of the back cover 7 because loads due to the friction resistance of the resin sheets 14 against the back cover 7 by the rotation of the back cover 7 are reduced by the slickness of the resin sheets 12, as shown in FIG. 3 to FIG. 5.

Also, the slick hold-down member 12 is structured such that, when the supporting member 13 is pressed toward the timepiece module 8 by the inner surface of the back cover 7 attached to the lower part of the wristwatch case 1, a plurality of upper surface portions of the supporting member 13 corresponding to the plurality of projections 13*a* presses the plurality of elastic projections 11*a* of the buffer member 11, and thereby presses the entire buffer member 11 against the housing 10 of the timepiece module 8, as shown in FIG. 3 to FIG. 5.

That is, the slick hold-down member 12 is structured such that, when the supporting member 13 presses the buffer member 11 against the housing 10 of the timepiece module 8, the timepiece module 8 is pressed against the wristwatch case 1 elastically by the elasticity of the buffer member 11 without being rattled, and also the resin sheets 14 are pressed against the inner surface of the back cover 7 by the elasticity of the buffer member 11, as shown in FIG. 2 to FIG. 5.

On the center of the back cover 7, a piezoelectric element 17 is provided, as shown in FIG. 2 and FIG. 6. This piezoelectric element 17 is formed in a disc shape, and structured to vibrate and emit a warning sound such as an alarm when a voltage is applied thereto. In this embodiment, the timepiece module 8 is provided with a first contact 18 and a second contact 19, as shown in FIG. 3 and FIG. 4.

The first contact 18 is a flat spring, and is provided with its one end being electrically connected to a portion of the circuit section (not shown) of the timepiece module 8 which corresponds to an area inside the inner circumferential rim of the slick hold-down member 12, as shown in FIG. 3 and FIG. 4. The other end of this first contact 18 protrudes downward from the area inside the inner circumferential rim of the slick hold-down member 12.

That is, as shown in FIG. 3 and FIG. 4, this first contact 18 is structured such that the other end protrudes below the slick hold-down member 12 through a first opening section 11*c* formed in a portion of the buffer member 11 corresponding to the area inside the inner circumferential rim of the slick hold-down member 12, and this protruding tip end section 18*a* comes in contact with the piezoelectric element 17 of the back cover 7 shown in FIG. 6. As a result, by this first contact 18, the piezoelectric element 17 is electrically connected to the circuit section (not shown) of the timepiece module 8.

As with the above-described first contact 18, the second contact 19 is a flat spring, and is provided with its one end being electrically connected to a portion of the circuit section (not shown) of the timepiece module 8 which corresponds to the slick hold-down member 12, as shown in FIG. 3 and FIG. 4. The other end of this second contact 19 protrudes below the slick hold-down member 12 through the buffer member 11 and the slick hold-down member 12.

More specifically, this second contact 19 is structured to protrude below the slick hold-down member 12 through a second opening section 11*d* formed in a portion of the buffer member 11 corresponding to the slick hold-down member 12, and a reinforcement cutout section 13*b* formed in the supporting member 13, as shown in FIG. 3 and FIG. 4. As a result, this second contact 19 is structured to electrically connect the back cover 7 and the circuit section (not shown) in a state to function as a ground by its protruding tip end section 19*a* coming in contact with an inner surface portion of the back cover 7 located at a point around the outer circumference of the piezoelectric element 17 shown in FIG. 6.

For example, in the case of a structure where the resin sheets 14 are adhered to the back cover 7, when the back cover 7 is rotated to be attached to the wristwatch case 1, the first contact 18 and the second contact 19 could be caught on the resin sheets 14 and the resin sheets 14 could come off depending on their adhered positions and sizes. However, in the case of the present embodiment, since the resin sheets 14 are positioned not on the back cover 7 side but on the buffer member 11 side and adhered to the supporting member 13 positionally fixed with respect to the timepiece module 8, the first contact 18 and the second contact 19 are not caught on the resin sheets 14 when the back cover 7 is rotated to be attached to the wristwatch case 1.

Next, a method for manufacturing the slick hold-down member 12 of the wristwatch is described with reference to FIG. 7 and FIG. 8A to FIG. 8D.

This method for manufacturing the slick hold-down member 12 includes a first step of providing on a protective sheet 20 the plurality of resin sheets 14 acquired by a resin sheet being divided, providing the adhesive layers 16 on the exposed surfaces of the resin sheets 14, and adhering a release sheet 21 to the adhesive layers 16, a second step of removing the release sheet 21, and adhering the resin sheets 14 to the supporting member 13 by the adhesive layers 16 with the positions of the resin sheets 14 being fixed by the protective sheet 20, and a third step of removing the protective sheet 20 with the resin sheets 14 remaining on the supporting member 13.

In this embodiment, before the first step, a plate made of a metal such as stainless steel is subject to press working so as to form the supporting member 13 in a substantially circular ring shape by punching. Here, on the supporting member 13, the plurality of projections 13*a*, the plurality of position restriction sections 15, and the reinforcement cutout section 13*b* are formed by the press working. In this press working, the plurality of projections 13*a* are formed along the circumference of the supporting member 13, the plurality of position restriction sections 15 are formed on opposing points on the one o'clock side and seven o'clock side of the supporting member 13 in a manner to project in the direction opposite to the plurality of projections 13*a*, and the reinforcement cutout section 13*b* are formed on the twelve o'clock side of the supporting member 13.

Figure 7:
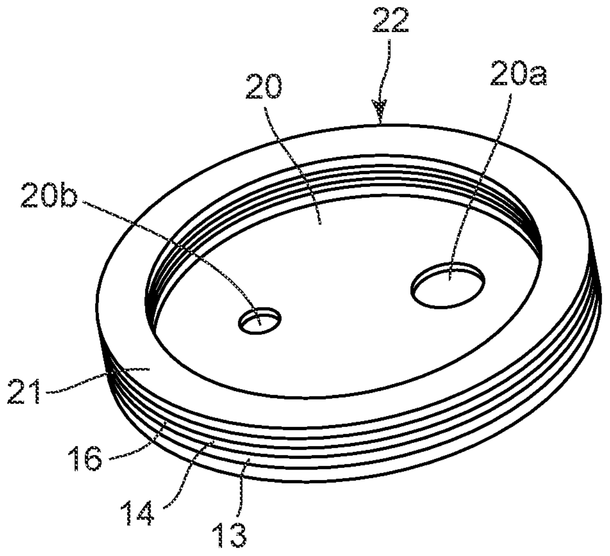
FIG. 7 is an enlarged perspective view showing a resin sheet body where resin sheets having adhesive layers for the slick hold-down member have been held between a protective sheet and a release sheet.

As a result, the supporting member 13 is formed which has the plurality of projections 13*a*, the plurality of position restriction sections 15, and the reinforcement cutout section 13*b*. Then, at the first step, the adhesive layers 16 are provided on the plurality of resin sheets 14 acquired by a resin sheet being divided, and these layers 16 and sheets 14 are held between the protective sheet 20 and the release sheet 21, whereby the resin sheet body 22 is formed, as shown in FIG. 7.

More specifically, in order to form the resin sheet body 22, one resin sheet is first divided into the plurality resin sheets 14 such that its portions corresponding to the plurality of position restriction sections 15 of the supporting member 13 and the reinforcement cutout section 13*b* thereof are excluded. Next, the plurality of resin sheets 14 acquired by a resin sheet being divided are provided on the protective sheet 20 with them being positioned corresponding to the supporting member 13 along the circumference of the supporting member 13.

Then, the adhesive layers 16 are provided on the plurality of resin sheets 14, and the release sheet 21 which has the same ring shape as the supporting member 13 is adhered to the adhesive layers 16. As a result, the resin sheet body 22 is formed. As such, although there are plural resin sheets 14, these resin sheets 14 are not misaligned by the protective sheet 20, and positioned on the protective sheet 20 with them corresponding to their predetermined positions on the supporting member 13.

In addition, although there are plural resin sheets 14 and the adhesive layers 16 are on these plural resin sheets 14, the resin sheet body 22 can be easily stored or conveyed because these sheets 14 and layers 16 are held between the protective sheet 20 and the release sheet 21.

Figure 8A:
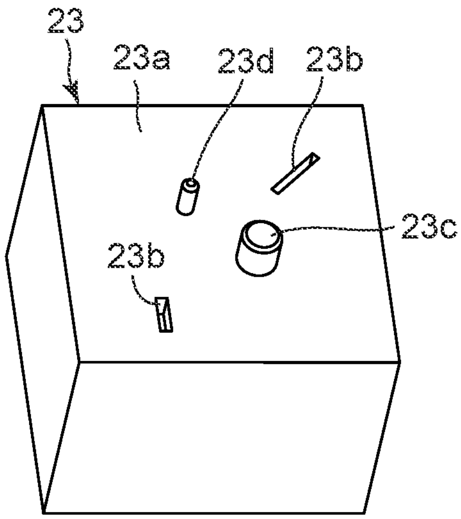
Figure 8B:
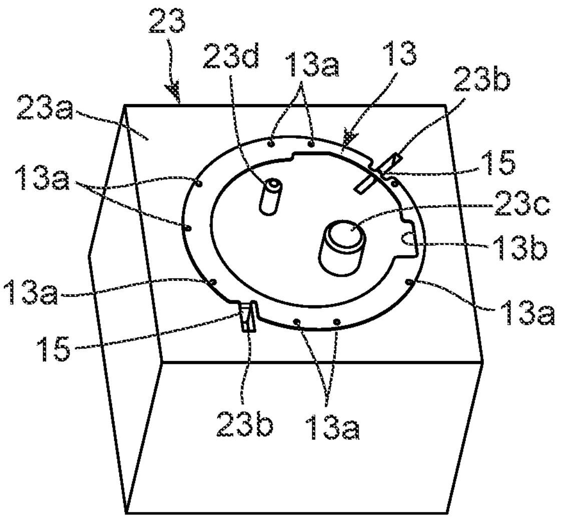

At the second step, the supporting member 13 is positioned on and attached to a positioning jig 23, as shown in FIG. 8B. In this embodiment, the positioning jig 23 includes a jig main body 23*a*. In the upper surface of the jig main body 23*a*, a plurality of positioning grooves 23*b* are formed into which the plurality of position restriction sections 15 provided on the supporting member 13 are inserted, as shown in FIG. 8A. In addition, on upper surface portions of the jig main body 23*a* corresponding to the area inside the inner circumferential rim of the supporting member 13, a large-diameter positioning pin 23*c* and a small-diameter positioning pin 23*d* are provided.

When the supporting member 13 is to be positioned on the positioning jig 23, the plurality of position restriction sections 15 of the supporting member 13 are inserted into the plurality of positioning grooves 23*b* of the positioning jig 23, as shown in FIG. 8B. As a result, the supporting member 13 is positioned and arranged at a predetermined position on the positioning jig 23. Here, the plurality of projections 13*a* of the supporting member 13 are exposed by projecting toward the side opposite to the positioning jig 23 and the reinforcement cutout section 13*b* of the supporting member 13 is arranged at a predetermined position on the positioning jig 23 with the two positioning pins 23*c* and 23*d* of the positioning jig 23 being positioned in the area inside the inner circumferential rim of the supporting member 13.

Figure 8C:
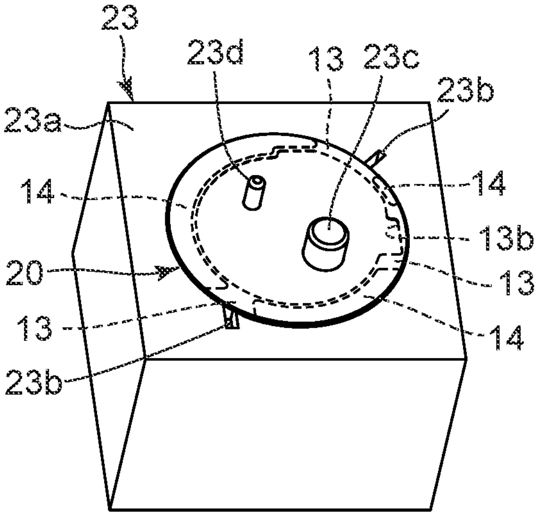

In this state, the release sheet 21 of the resin sheet body 22 is removed from the adhesive layers 16, the positions of the resin sheets 14 with respect to the positioning jig 23 are determined using the protective sheet 20, and the resin sheets 14 are adhered to the supporting member 13, as shown in FIG. 8C. Here, the protective sheet 20 has provided therein a large-diameter pin insertion hole 20*a* where the large-diameter positioning pin 23*c* of the positioning jig 23 is inserted and a small-diameter pin insertion hole 20*b* where the small-diameter positioning pin 23*d* is inserted.

Accordingly, when the resin sheets 14 are to be adhered to the supporting member 13, the large-diameter positioning pin 23*c* of the positioning jig 23 is inserted into the large-diameter pin insertion hole 20*a* of the protective sheet 20, and the small-diameter positioning pin 23*d* of the positioning jig 23 is inserted into the small-diameter pin insertion hole 20*b* of the protective sheet 20, as shown in FIG. 8C. Here, because of the two positioning pins 23*c* and 23*d* of the positioning jig 23 whose sizes are different from each other and the two pin insertion holes 20*a* and 20*b* of the protective sheet 20 whose sizes are different from each other, wrong insertion is prevented, and the protective sheet 20 is precisely positioned on the positioning jig 23.

As a result of this structure, although there are plural resin sheets 14, these plural resin sheets 14 are precisely arranged corresponding to their predetermined positions on the supporting member 13 by being on the protective sheet 20. That is, the plurality of resin sheets 14 are arranged on the supporting member 13 excluding portions corresponding to the plurality of position restriction sections 15 and the reinforcement cutout section 13*b*, and covers the plurality of projections 13*a* of the supporting member 13. As a result, by the adhesive layers 16, the plurality of resin sheets 14 are adhered to the predetermined positions on the supporting member 13.

Figure 8D:
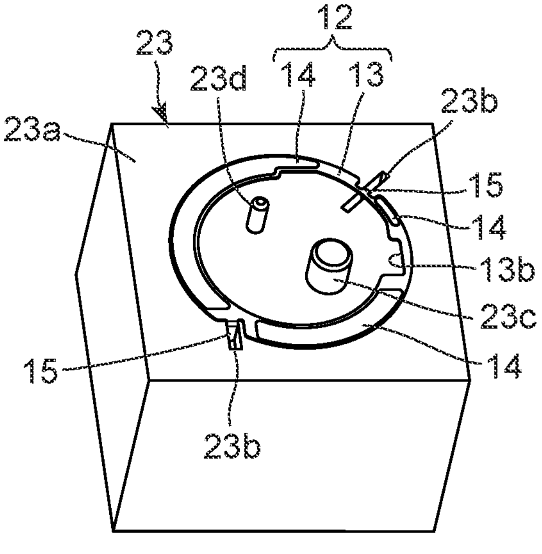

At the third step, the protective sheet 20 is removed from the plurality of resin sheets 14, and the plurality of resin sheets 14 remains with them being adhered to the predetermined positions. By the above-described steps, the plurality of resin sheets 14 acquired by a resin sheet being divided are precisely and unfailingly adhered by the adhesive layers 16 to the predetermined positions on the supporting member 13 excluding the portions corresponding to the plurality of position restriction sections 15 and the reinforcement cutout section 13*b*, and covers the plurality of projections 13*a* of the supporting member 13, as shown in FIG. 8D.

Next, a procedure for assembling this wristwatch is described.

In this procedure, first, the watch glass 6 is fitted into and attached to the upper opening of the case main body 2 of the wristwatch case 1 together with the packing 6*a*. In this state, the first exterior members 3*a* which are side bezels are arranged on the side surfaces of the case main body 2 on the three o'clock side and the nine o'clock side, and the second exterior member 3*b* which is an upper bezel is arranged on the upper parts of the first exterior members 3*a* and the upper part of the case main body 2.

Then, the third exterior members 3*c* which are band attachment bezels are arranged on the band attachment projection sections 2*a* of the case main body 2, and attached by the plurality of screw members 3*d*. As a result, the second exterior member 3*b* is fixed to the upper part of the case main body 2 by the third exterior members 3*c*, and the first exterior members 3*a* are fixed to the side surfaces of the case main body 2 by the second exterior member 3*b*, whereby the assembly of the wristwatch case 1 is completed.

In this state, the switch buttons 5 are attached to the two o'clock side, four o'clock side, eight o'clock side, and ten o'clock side of the wristwatch case 1. Subsequently, the timepiece module 8 is mounted in the wristwatch case 1 together with the middle frame 9. Then, the buffer member 11 is arranged under the timepiece module 8, and the slick hold-down member 12 is arranged under the buffer member 11.

Here, the buffer member 11 is arranged with the plurality of elastic projections 11*a* corresponding to the plurality of projections 13*a* of the supporting member 13. In this state, the plurality of position restriction sections 15 of the supporting member 13 are inserted into the housing 10 through the plurality of buffering notch sections 11*b* of the buffer member 11 so as to attach the slick hold-down member 12. As a result, the slick hold-down member 12 having the two-layer structure where the supporting member 13 and the resin sheets 14 have been laminated is attached to the timepiece module 8 and the buffer member 11 is elastically pressed against the housing 10 of the timepiece module 8 by the supporting member 13.

Here, since the slick hold-down member 12 has the two-layer structure where the resin sheets 14 have been adhered to the supporting member 13 such that they are consolidated, the supporting member 13 and the resin sheets 14 are not required to be individually attached to the timepiece module 8, and can be attached to the timepiece module 8 at once. As a result of this structure, the attachment of the supporting member 13 and the resin sheets 14 can be easily performed, which simplifies the assembling work related to the supporting member 13 and the resin sheets 14.

Also, here, the first contact 18 provided on the circuit section (not shown) of the timepiece module 8 protrudes below the slick hold-down member 12 through the first opening section 11*c* of the buffer member 11 and, similarly, the second contact 19 provided on the circuit section of the timepiece module 8 protrudes below the slick hold-down member 12 through the second opening section 11*d* of the buffer member 11 and the reinforcement cutout section 13*b* of the supporting member 13. In this state, the back cover 7 is attached to the lower part of the wristwatch case 1, that is, the lower part of the case main body 2.

Before this attachment, the piezoelectric element 17 is provided on the center of the inner surface of the back cover 7. In this state, when the back cover 7 is attached to the lower part of the case main body 2 of the wristwatch case 1, the female screw section 7*b* formed on the inner circumferential surface of the portion of the back cover 7 located one step higher than the other portions is rotated and tightened to engage with the male screw section 2*b* formed on the outer circumferential surface of the lower part of the case main body 2 of the wristwatch case 1. As a result, the back cover 7 is attached to the lower part of the case main body 2 of the wristwatch case 1.

When the back cover 7 is being attached to the lower part of the case main body 2 of the wristwatch case 1 as described above, since the supporting member 13 of the slick hold-down member 12 presses the resin sheets 14 against the inner surface of the back cover 7, the portions of the resin sheets 14 corresponding to the plurality of projections 13*a* of the supporting member 13 are pressed in substantially point-contact states against the inner surface of the back cover 7, or more specifically, inner surface portions of the back cover 7 located around the outer circumference of the piezoelectric element 17. Accordingly, the slick resin sheets 14 pressed by the supporting member 13 slide smoothly on the inner surface of the back cover 7 in substantially point-contact states.

As a result of this structure, when the back cover 7 is being rotated to engage with the wristwatch case 1, loads due to the frictional resistance of the resin sheets 14 against the back cover 7 by the rotation of the back cover 7 are reduced, so that the timepiece module 8 is not rotated in the wristwatch case 1. Consequently, the pointers of the timepiece movement of the timepiece module 8 and the display section of the timepiece module 8 are not mispositioned with respect to the wristwatch case 1, and the timepiece module 8 is accurately arranged inside the wristwatch case 1, whereby the wristwatch whose quality and commodity value is high is acquired.

Also, when the back cover 7 is being rotated to be attached to the case main body 2 of the wristwatch case 1, the tip end section 18*a* of the first contact 18 provided on the timepiece module 8 resiliently comes in contact with and slides on the piezoelectric element 17 of the back cover 7, and the tip end section 19*a* of the second contact 19 resiliently comes in contact with and slides on an inner surface portion of the back cover 7 located at a point around the outer circumference of the piezoelectric element 17. Accordingly, the timepiece module 8 is not rotated in the wristwatch case 1.

As a result of this structure, the first contact 18 maintains electrical connection between the piezoelectric element 17 and the circuit section (not shown) of the timepiece module 8 even when the tip end section 18*a* resiliently comes in contact with and slides on the piezoelectric element 17 by the rotation of the back cover 7. In addition, the second contact 19 maintains electrical connection between the back cover 7 and the circuit section of the timepiece module 8 even when the tip end section 19*a* resiliently comes in contact with and slides on the inner surface of the back cover 7.

When the back cover 7 is attached to the case main body 2 of the wristwatch case 1 as described above, the buffer member 11 is unfailingly and favorably pressed against the housing 10 of the timepiece module 8 by the supporting member 13. Accordingly, by the elasticity of the buffer member 11, the timepiece module 8 is held down in the wristwatch case 1 without rattling. In addition, by the elasticity of the buffer member 11, the resin sheets 14 are favorably pressed against the inner surface of the back cover 7.

For example, the wristwatch disclosed in Japanese Patent Application Laid-Open (Kokai) Publication No. 11-183650 has a structure where a hold-down plate is provided on the undersurface of the timepiece module, a slick member is provided on the inner surface of the back cover, and a plurality of projections provided on circumferential portions of the hold-down plate are pressed against the slick member. When the wristwatch case is rotated to be attached to the back cover in this state, the plurality of projections of the hold-down plate slides on the surface of the slick member so as to prevent the rotation of the timepiece module inside the wristwatch case and thereby prevent the display of the timepiece module, such as time display, from being mispositioned.

However, this wristwatch has a problem in that, since the slick member is provided on the inner surface of the back cover, the back cover is constrained by this slick member and therefore a function such as a piezoelectric element is difficult to be added to the back cover.

In contrast, the slick hold-down member 12 of the wristwatch disclosed herein includes the supporting member 13 which is arranged on the timepiece module 8 having the display section and serving as a first member and includes the plurality of projections 13*a* projecting toward the side opposite to the timepiece module 8, and the slick resin sheets 14 which are adhered to the supporting member 13 while covering the plurality of projections 13*a* and whose portions corresponding to the plurality of projections 13*a* are pressed by the back cover 7 serving as a second member which is arranged to be rotatable with respect to the timepiece module 8, whereby the display of the timepiece module 8, such as time display, can be prevented from being mispositioned, the assembly work can be simplified, and new functions can be added.

That is, with this slick hold-down member 12, the portions of the resin sheets 14 corresponding to the plurality of projections 13*a* of the supporting member 13 are pressed against the inner surface of the back cover 7 in substantially point-contact states when the resin sheets 14 are pressed against the inner surface of the back cover 7 by the supporting member 13. As a result of this structure of the slick hold-down member 12, when the back cover 7 is rotated to be attached to and engage with the wristwatch case 1, the resin sheets 14 pressed against the inner surface of the back cover 7 in the point-contact states smoothly slide on the inner surface of the back cover 7, whereby loads due to the frictional resistance of the resin sheets 14 against the back cover 7 by the rotation of the back cover 7 can be reduced.

Accordingly, the slick hold-down member 12 is not rotated along with the rotation of the back cover 7 and therefore the timepiece module 8 is not rotated inside the wristwatch case 1. As a result of this structure, the pointers of the timepiece movement of the timepiece module 8, the display of the display section of the timepiece module 8, and the like are not mispositioned with respect to the wristwatch case 1, and the timepiece module 8 is accurately arranged inside the wristwatch case 1, whereby the wristwatch whose quality and commodity value are high can be acquired.

Also, this slick hold-down member 12 has the two-layer structure where the resin sheets 14 have been adhered to the supporting member 13 such that they are consolidated. As a result of this structure, the supporting member 13 and the resin sheets 14 are not required to be individually attached to the timepiece module 8, and can be attached to the timepiece module 8 at once. That is, with this slick hold-down member 12, the attachment of the supporting member 13 and the resin sheets 14 can be easily performed, which simplifies assembly related to the supporting member 13 and the resin sheets 14.

Moreover, in this slick hold-down member 12, no resin sheet 14 is provided on the inner surface of the back cover 7, and therefore the constraint of the back cover 7 by the resin sheets 14 can be reduced. By this structure of the slick hold-down member 12, the function for emitting a warning sound such as an alarm by the piezoelectric element 17 being provided on the back cover 7 can be added, which achieves the multi-functionalization.

In the case of the slick hold-down member 12 of the present embodiment, the supporting member 13 is made of a highly rigid metal, and the resin sheets 14 are made of a highly slick fluorine resin. Accordingly, the resin sheets 14 can be unfailingly and favorably pressed against the inner surface of the back cover 7 by the supporting member 13 made of a highly rigid metal.

Also, in the case of this slick hold-down member 12 where the resin sheets 14 are made of a highly slick fluorine resin, even when the back cover 7 is rotated to engage with the wristwatch case 1 and the resin sheets 14 are pressed against the inner surface of the back cover 7, loads due to the frictional resistance of the resin sheets 14 against the inner surface of the back cover 7 is significantly low. As a result, the resin sheets 14 can be further smoothly slid on the inner surface of the back cover 7, which unfailingly prevents the slick hold-down member 12 from being rotated by the rotation of the back cover 7.

Moreover, in the case of this slick hold-down member 12, the supporting member 13 is formed in a ring shape, and the plurality of projections 13*a* are formed along the circumference thereof. Accordingly, the portions of the resin sheets 14 corresponding to the plurality of projections 13*a* of the supporting member 13 can be unfailingly and favorably pressed against the inner surface of the back cover 7 in substantially point-contact states by the supporting member 13. As a result of this structure, loads due to the frictional resistance of the resin sheets 14 against the inner surface of the back cover 7 can be reliably reduced.

Furthermore, in the case of this slick hold-down member 12, one resin sheet is divided into the plurality of resin sheets 14, and thereby can be provided on only the portions of the supporting member 13 requiring these resin sheets 14. In addition, by this structure, the plurality of position restriction sections 15 and the reinforcement cutout section 13*b* into which the second contact 19 is inserted can be favorably provided at the portions of the supporting member 13 located between adjacent resin sheets 14.

Still further, in the slick hold-down member 12, the supporting member 13 includes the plurality of position restriction sections 15 which restricts its position with respect to the timepiece module 8. As a result of this structure, by the plurality of position restriction sections 15, the rotation of the supporting member 13 in its circumferential direction and the mispositioning of the supporting member 13 in its radial direction with respect to the timepiece module 8 can be unfailingly prevented, whereby the position of the supporting member 13 with respect to the timepiece module 8 can be precisely and reliably restricted.

Yet still further, in this slick hold-down member 12, the buffer member 11 is arranged between the supporting member 13 and the timepiece module 8. Accordingly, when the supporting member 13 is pressed against the timepiece module 8 via the resin sheets 14 by the back cover 7, the buffer member 11 is unfailingly and favorably pressed against the housing 10 of the timepiece module 8 by the supporting member 13. As a result, by the elasticity of the buffer member 11, the timepiece module 8 is pressed and held in the wristwatch case 1 without rattling and the resin sheets 14 are favorably pressed against the inner surface of the back cover 7.

The method for manufacturing this slick hold-down member 12 includes the first step of providing on the protective sheet 20 the plurality of resin sheets 14 acquired by a resin sheet being divided, providing the adhesive layers 16 on the exposed surfaces of the resin sheets 14, and adhering the release sheet 21 to the adhesive layers 16, the second step of removing the release sheet 21, and adhering the resin sheets 14 to the supporting member 13 by the adhesive layers 16 with the positions of the resin sheets 14 being fixed by the protective sheet 20, and the third step of removing the protective sheet 20 with the resin sheets 14 remaining on the supporting member 13. Accordingly, the plurality of resin sheets 14 acquired by a resin sheet being divided can be precisely adhered to the supporting member 13, whereby the slick hold-down member 12 can be easily and favorably manufactured.

More specifically, in this manufacturing method for the slick hold-down member 12, at the first step, one resin sheet 14 is divided into the plurality resin sheets 14 while excluding its portions corresponding to the plurality of position restriction sections 15 and the reinforcement cutout section 13*b* of the supporting member 13. Then, these resin sheets 14 are provided on the protective sheet 20 with them being positioned along the circumference of the supporting member 13. By being provided and fixed on the protective sheet 20, these plural resin sheets 14 are not misaligned, and are arranged corresponding to their predetermined positions on the supporting member 13.

In the present embodiment, at this first step of the manufacturing method for the slick hold-down member 12, the plurality of resin sheets 14 acquired by a resin sheet being divided is provided on the protective sheet 20 as described above. Then, the adhesive layers 16 are provided on the exposed surfaces of the plurality of resin sheets 14, and the release sheet 21 having the same ring shape as the supporting member 13 are adhered to the adhesive layers 16, whereby the resin sheet body 22 is formed. By this structure, although there are plural resin sheets 14 and the adhesive layers 16 are on these plural resin sheets 14, the resin sheet body 22 can be easily handled when it is being stored, conveyed, or the like.

Also, at the second step of this manufacturing method for the slick hold-down member 12, the supporting member 13 is positioned on the positioning jig 23. Then, in this state, the resin sheets 14 where the release sheet 21 has been removed are positioned on the positioning jig 23 by use of the protective sheet 20 and adhered to the supporting member 13 by the adhesive layers 16. As such, although there are plural resin sheets 14, these resin sheets 14 can be precisely and favorably adhered to the supporting member 13 at once by use of the protective sheet 20, which improves workability when the resin sheets 14 are adhered to the supporting member 13.

More specifically, at this second step, when the supporting member 13 is to be positioned on the positioning jig 23, the plurality of position restriction sections 15 of the supporting member 13 is inserted into the plurality of positioning grooves 23*b* of the positioning jig 23. As a result, the supporting member 13 is precisely and reliably arranged at the predetermined position on the positioning jig 23 with the plurality of projections 13*a* thereof being exposed on the side opposite to the positioning jig 23.

In addition, at this second step, when being adhered to the supporting member 13, the resin sheets 14 where the release sheet 21 has been removed are precisely positioned on the positioning jig 23 by use of the protective sheet 20. More specifically, at this second step, the large-diameter positioning pin 23*c* of the positioning jig 23 is inserted into the large-diameter pin insertion hole 20*a* of the protective sheet 20, and the small-diameter positioning pin 23*d* of the positioning jig 23 is inserted into the small-diameter pin insertion hole 20*b* of the protective sheet 20. As a result, the protective sheet 20 can be precisely and favorably positioned on the positioning jig 23.

Here, by the two positioning pins 23*c* and 23*d* of the positioning jig 23 whose sizes are different from each other and the two pin insertion holes 20*a* and 20*b* of the protective sheet 20 whose sizes are also different from each other, wrong insertion can be prevented, whereby the protective sheet 20 can be precisely and favorably positioned on the positioning jig 23. Accordingly, at this second step, although there are plural resin sheets 14, these plural resin sheets 14 can be precisely and reliably positioned and arranged at their predetermined positions on the supporting member 13 by the protective sheet 20.

That is, at this second step, by being provided on the protective sheet 20 in a manner to be arranged on the supporting member 13 excluding the portions corresponding to the plurality of position restriction sections 15 and the reinforcement cutout section 13*b* while covering the plurality of projections 13*a* of the supporting member 13, the plurality of resin sheets 14 acquired by a resin sheet being divided can be precisely positioned by the protective sheet 20, and precisely and reliably adhered to the predetermined positions on the supporting member 13 by the adhesive layers 16.

Also, in this wristwatch having the slick hold-down member 12, the timepiece module 8 includes the second contact 19 which comes in contact with the inner surface of the back cover 7. By coming in contact with the inner surface of the back cover 7 through the reinforcement cutout section 13*b* which is an opening formed in the slick hold-down member 12, this second contact 19 functions as a ground and electrically connects the circuit section (not shown) of the timepiece module 8 and the back cover 7 reliably and favorably.

In the wristwatch of this embodiment, the piezoelectric element 17 is provided on the center of the inner surface of the back cover 7, and the resin sheets 14 of the slick hold-down member 12 are pressed against the inner surface portions of the back cover 7 located around the outer circumference of the piezoelectric element 17. By this structure where the piezoelectric element 17 is provided on the inner surface of the back cover 7, the function for emitting a warning sound such as an alarm is added, which achieves the multi-functionalization. In addition, by this structure where the resin sheets 14 are pressed against the inner surface portions of the back cover 7 located around the outer circumference of the piezoelectric element 17, loads due to the friction resistance of the resin sheets 14 by the rotation of the back cover 7 are reduced even after the multi-functionalization is achieved.

As described above, in this wristwatch, the rotation of the hold-down member 12 due to the rotation of the back cover 7 does not occur, so that the timepiece module 8 is not rotated in the wristwatch case 1 and the pointers of the timepiece movement of the timepiece module 8 and the display section of the timepiece module 8 are not mispositioned with respect to the wristwatch case 1. As a result of this structure, the timepiece module 8 is accurately arranged inside the wristwatch case 1, whereby the wristwatch whose quality and commodity value is high can be acquired.

In the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. Furthermore, the present invention is not necessarily required to be applied in timepieces, and can be applied in electronic devices such as a portable telephone and a portable terminal device.

While the present invention has been described with reference to the preferred embodiments, it is intended that the invention be not limited by any of the details of the description therein but includes all the embodiments which fall within the scope of the appended claims.

What is claimed is:

1. A timepiece comprising:

a hold-down member comprising:

a plate member which is arranged on a first member, wherein the first member has a circuit section, and wherein the plate member supports the first member; and at least one resin sheet which is adhered to the plate member, wherein the resin sheet is pressed by a second member, wherein the second member is arranged to be rotatable with respect to the first member, and wherein the resin sheet slides on the second member, wherein the circuit section has a contact electrically connected thereto, wherein the plate member has a cutout section, wherein the contact electrically connects the circuit section and the second member by extending through the cutout section in a direction from the first member towards the second member, and wherein the at least one resin sheet is formed of fluorine resin.

2. The timepiece according to claim 1, wherein the plate member includes a plurality of projections projecting toward the at least one resin sheet, wherein the at least one resin sheet is adhered to the plate member while covering the plurality of projections, and wherein portions of the at least one resin sheet corresponding to the plurality of projections are pressed by the second member.

3. The timepiece according to claim 1, wherein the plate member is formed of metal.

4. The timepiece according to claim 2, wherein the plate member is formed in a ring shape, and wherein the plurality of projections are formed along circumference of the plate member.

5. The timepiece according to claim 1, wherein the plate member has a plurality of position restriction portions which restricts a position of the plate member with respect to the first member.

6. A timepiece comprising:

a hold-down member comprising:

a plate member which is arranged on a first member, wherein the first member has an electronic component, and wherein the plate member supports the first member; and at least one resin sheet which is adhered to the plate member, wherein the resin sheet is pressed by a second member, wherein the second member is arranged to be rotatable with respect to the first member, and wherein the resin sheet slides on the second member, wherein the plate member has a plurality of position restriction portions which restricts a position of the plate member with respect to the first member, wherein the plurality of position restriction portions restricts the position of the plate member in rotation directions with respect to the first member when the second member rotates with respect to the first member, wherein the plate member includes a plurality of projections projecting toward the at least one resin sheet, and wherein the at least one resin sheet is adhered to the plate member while covering the plurality of projections, and portions of the at least one resin sheet corresponding to the plurality of projections are pressed by the second member.

7. The timepiece according to claim 6, wherein the plate member is formed in a ring shape, and wherein the plurality of projections are formed along circumference of the plate member.

8. The timepiece according to claim 6, wherein the plate member is formed of metal.

9. The timepiece according to claim 6, wherein the at least one resin sheet is formed of fluorine resin.

10. The timepiece according to claim 6, wherein the at least one resin sheet comprises a plurality of resin sheets that are adhered to respective positions without covering a cutout section of the plate member.

11. The timepiece according to claim 6, further comprising a buffer member arranged between the plate member and the first member.

12. A timepiece comprising:

a hold-down member comprising:

a plate member which is arranged on a first member, wherein the first member has an electronic component, and wherein the plate member supports the first member; and at least one resin sheet which is adhered to the plate member, wherein the resin sheet is pressed by a second member, wherein the second member is arranged to be rotatable with respect to the first member, and wherein the resin sheet slides on the second member, wherein the plate member has a plurality of position restriction portions which restricts a position of the plate member with respect to the first member, wherein the plurality of position restriction portions restricts the position of the plate member in rotation directions with respect to the first member when the second member rotates with respect to the first member, wherein the first member is a timepiece module which is arranged in a timepiece case, wherein the second member is a back cover which is rotated to be attached to a lower part of the timepiece case, wherein the plate member includes a plurality of projections projecting toward the at least one resin sheet, and wherein the plate member of the hold-down member is arranged under the timepiece module, and portions of the at least one resin sheet corresponding to the plurality of projections of the plate member are pressed against an inner surface of the back cover.

13. The timepiece according to claim 12, wherein a piezoelectric element is provided on a center of the inner surface of the back cover, and wherein the at least one resin sheet of the hold-down member is pressed against an inner surface portion of the back cover located around an outer circumference of the piezoelectric element.

* * * * *